United States Patent [19]

Leinenger

[11] 4,415,074
[45] Nov. 15, 1983

[54] WORKPIECE SUPPORT BEARING FOR MODULAR CHUTING

[75] Inventor: John T. Leinenger, Pontiac, Mich.

[73] Assignee: Modular Automation, Inc., Pontiac, Mich.

[21] Appl. No.: 340,370

[22] Filed: Jan. 18, 1982

Related U.S. Application Data

[63] Continuation-in-part of Ser. No. 265,664, May 20, 1981, Pat. No. 4,381,834, and a continuation-in-part of Ser. No. 312,541, Oct. 19, 1981.

[51] Int. Cl.³ .............................................. B65G 13/00
[52] U.S. Cl. ..................................... 193/37; 411/188;
411/424; 384/418
[58] Field of Search ................. 193/35 R, 35 C, 35 J,
193/37; 308/20, 237 A; 198/829; 312/257 A,
257 R, 263, 264; 211/189; 411/2–5, 185, 187,
188, 189, 330, 332, 411, 424; 277/136, 137,
DIG. 10; 403/2; 301/5.7, 110, 114, 124 R

[56] References Cited

U.S. PATENT DOCUMENTS

| 511,616 | 12/1893 | Holmes | 411/330 |
| 1,297,845 | 3/1919 | Hawrylasz | 411/330 |
| 2,717,071 | 9/1955 | Cook | 193/35 R X |

Primary Examiner—Jeffrey V. Nase
Attorney, Agent, or Firm—Basile, Weintraub & Hanlon

[57] ABSTRACT

A workpiece support bearing for modular chuting for passing the workpiece along the chute is disclosed. The chute of the present invention includes a pair of side walls secured in a spaced apart manner by a plurality of clips attached to upper and lower edges of the side walls. Wear members are disclosed that are selectively secured to the walls of the chute or to the clips to reduce friction and wear from parts moving along the chute.

4 Claims, 34 Drawing Figures

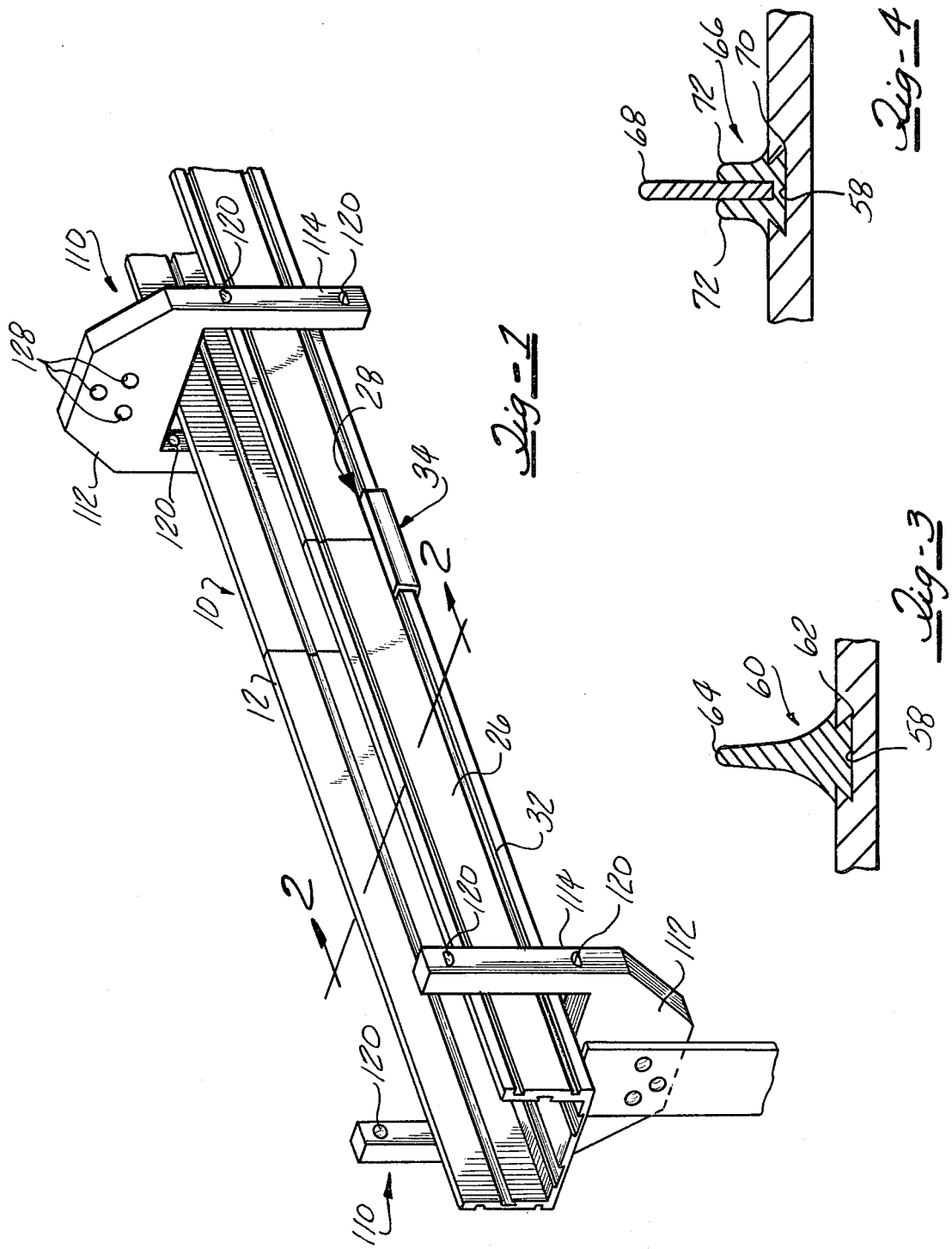

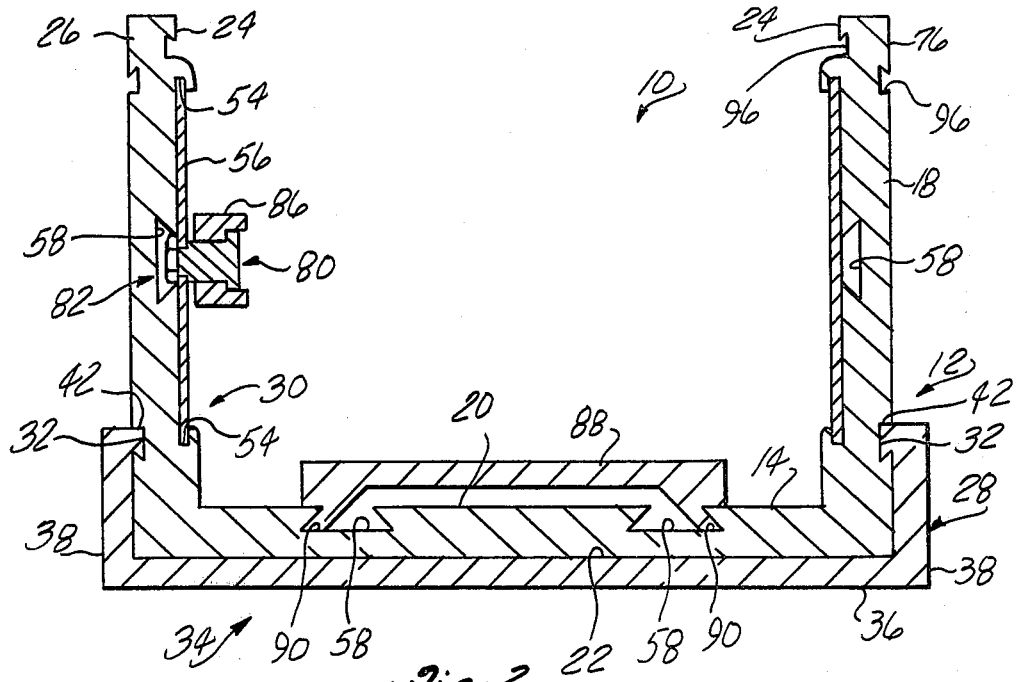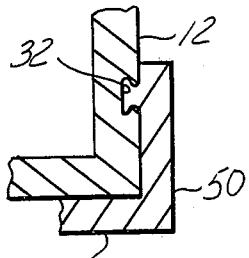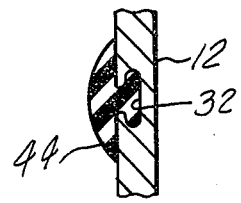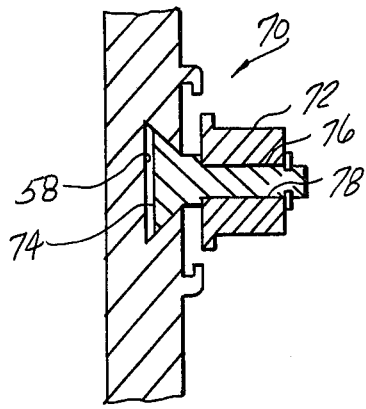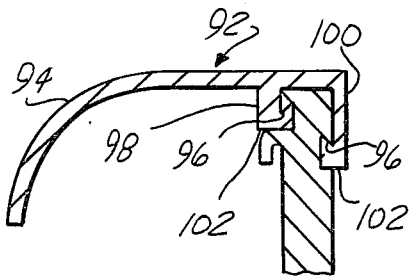

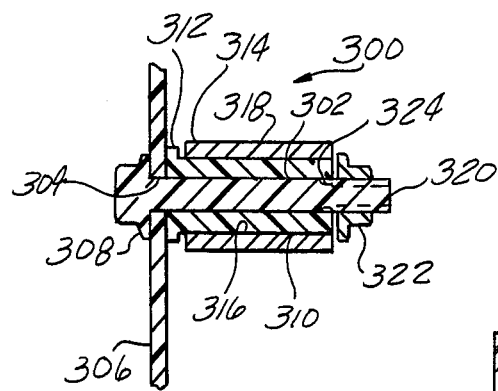
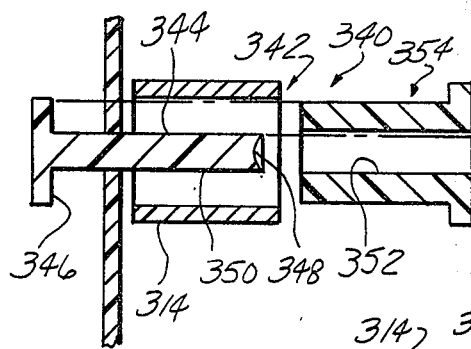
Fig-23
Fig-24
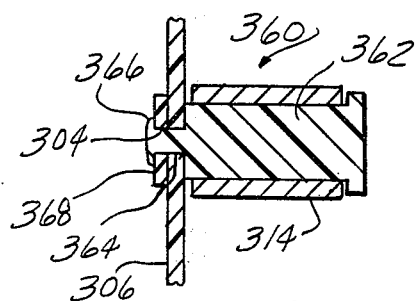
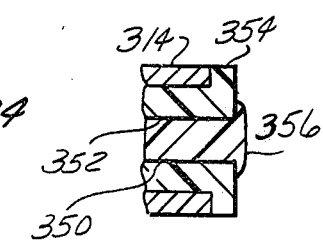
Fig-26
Fig-25
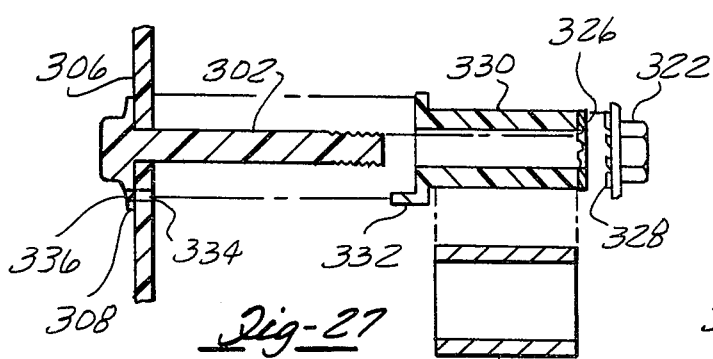
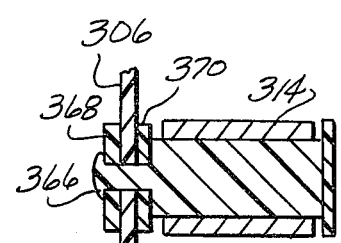
Fig-27
Fig-28
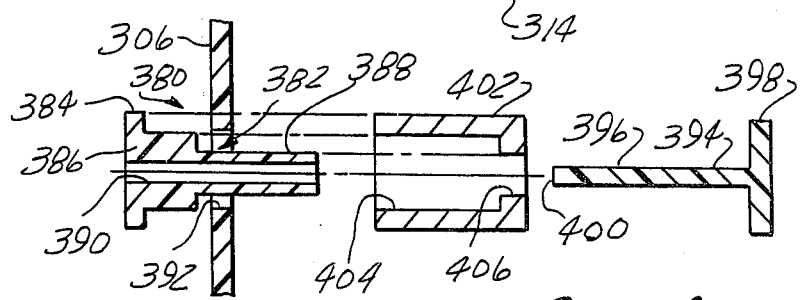
Fig-29

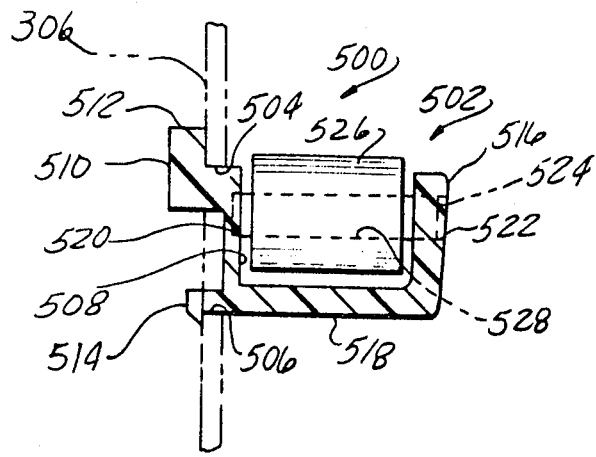
_Fig-30_
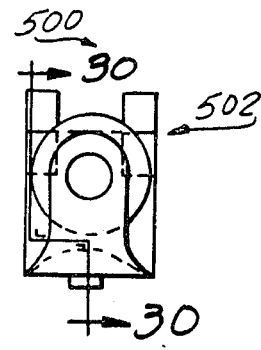
_Fig-31_
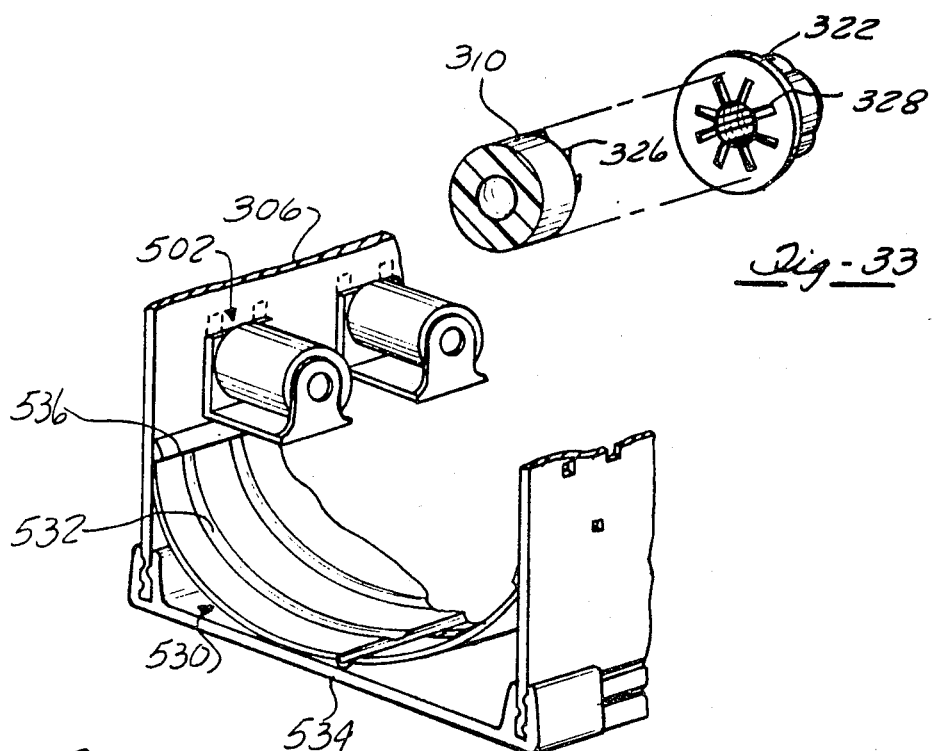
_Fig-32_
_Fig-33_
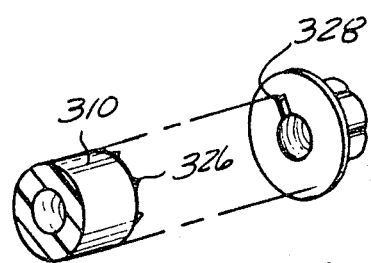
_Fig-34_

WORKPIECE SUPPORT BEARING FOR MODULAR CHUTING

This application is a continuation-in-part of copending application Ser. No. 265,664 filed May 20, 1981, now U.S. Pat. No. 4,381,834, entitled "Modular Chuting", and copending application Ser. No. 312,541 filed Oct. 19, 1981 entitled "Modular Open Chuting", the disclosure of which is incorporated by reference.

BACKGROUND OF THE INVENTION

I. Field of the Invention

The present invention generally relates to material handling devices and, in particular, the present invention is concerned with modular chuting for moving workpieces from one place to another under gravity and along the chute.

II. Description of the Prior Art

Chutes, both linear and curved, for conveying parts from one location to another are well known in the art. A variety of methods have been proposed for joining and supporting chutes as well as for providing chutes with projections along their inside walls to aid in part conveyance. Examples of chutes and chute systems in the prior art are disclosed in U.S. Pat. No. 1,252,616; U.S. Pat. No. 971,087; U.S. Pat. No. 2,218,444; U.S. Pat. No. 2,284,488; and U.S. Pat. No. 4,198,043. Examples of chutes and chuting systems having a non-linear form are disclosed in U.S. Pat. No. 424,271; U.S. Pat. No. 790,776; U.S. Pat. No. 1,013,292; U.S. Pat. No. 1,256,724; U.S. Pat. No. 1,720,843; U.S. Pat. No. 1,802,089; U.S. Pat. No. 3,343,793; and U.S. Pat. No. 3,837,452. These patents are relevant to the Applicant's invention in that they represent the closest prior art for utilizing chutes to convey parts from one location to another under gravity. They do not, however, disclose or anticipate the device of the present invention of a pair of spaced sidewalls secured in a spaced manner by a plurality of transverse clips. None of the above listed U.S. patents disclose nor anticipate the use of grooves or recesses formed along the sidewalls of the chute and support clips attached to the transverse clips to receive wear-resistant inserts to aid in the movement of workpieces along the chute as disclosed in the present invention, nor do they disclose nor anticipate the workpiece support bearings of the present invention.

III. Prior Art Statement

The aforementioned prior art, in the opinion of the Applicant and the Applicant's attorney, represents the closest prior art of which the Applicant and his attorney are aware.

SUMMARY OF THE INVENTION

The present invention, which will be described in greater detail hereinafter, comprises a modular chute for passing a workpiece therealong which includes a plurality of lengths of chute having spaced apart sidewalls held in a spaced relationship by a plurality of transverse clips attached to the upper and lower edges of the sidewalls. Grooves or recesses formed along sidewalls of the chute are utilized to selectively attach a variety of wear-resistant members to the walls of the chute to minimize wear and to assist in the movement of the workpieces along the chute.

The chute of the present invention includes a plurality of support clips attached to the transverse clips which support a wear-resistant support piece deployed longitudinally along the bottom of the chute to support the workpiece. An adhesive is preferably used to bond the sidewall ends, one to the other or with the aid of an overlaying clip which may be bonded or welded to the chute sides.

In a preferred embodiment, the present invention discloses a wall supported anti-friction bearing for supporting a workpiece and aiding the movement of the workpiece along the chute under gravity.

It is therefore a primary object of the present invention to provide a new and improved modular chute system utilizing an anti-friction bearing supported by the chute to support a workpiece and aid in the movement of the workpiece along the chute under gravity.

It is a further object of the present invention to provide a modular chute system which may be readily joined into a continuous piece.

It is yet another object of the present invention to provide grooves and recesses along the inside wall of the chute to selectively attach wear-resistant members which aid in the movement of workpieces along the chute.

It is another object of the present invention to provide anti-friction bearings and bearing supports that may be selectively attached to the walls of the chute to reduce wear and friction.

It is yet another object of the present invention to provide an improved chute system which may be readily and inexpensively installed.

Further objects, advantages and applications of the present invention will become apparent to those skilled in the art of conveyors and chute systems when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the various views, and wherein:

FIG. 1 illustrates a broken, perspective view of the chuting system of the present invention;

FIG. 2 illustrates a cross-sectional view of the chute taken along line 2—2 of FIG. 1;

FIG. 3 illustrates a partial cross-sectional view of a wear-reducing element engageable with a dovetail joint of FIG. 2;

FIG. 4 illustrates an alternate embodiment of a wear-reducing element engageable with the dovetail groove of FIG. 2;

FIG. 5 illustrates an alternate embodiment of a joining device for joining lengths of chute together;

FIG. 6 illustrates a cross-section view of an additional embodiment of a method for joining lengths of chute together;

FIG. 7 illustrates a bearing support and an anti-friction bearing engageable with a dovetail groove;

FIG. 8 illustrates a cross-sectional view of a part retainer engageable with an upper edge of the chute;

FIG. 11 illustrates a broken perspective view of the open chuting system of the present invention;

FIG. 23 illustrates a cross-sectional view of a sidewall supported anti-friction bearing;

FIG. 24 illustrates another embodiment of a sidewall supported anti-friction bearing;

FIG. 25 illustrates a broken cross-sectional view of a welded end for fixedly securing the anti-friction bearing of FIG. 24 to the sidewall;

FIG. 26 illustrates an alternate configuration of a sidewall supported anti-friction bearing;

FIG. 27 illustrates an exploded cross-sectional view of an additional embodiment of a sidewall supported anti-friction bearing;

FIG. 28 illustrates a partially sectioned sidewall mounted anti-friction bearing;

FIG. 29 illustrates a partially sectioned sidewall supported anti-friction bearing having a reduced bearing area;

FIG. 30 illustrates a partially sectioned unitized bearing carrier and anti-friction bearing;

FIG. 31 shows the bearing carrier of FIG. 30 taken from the line 31—31 of FIG. 30; and FIG. 32 illustrates a broken perspective view of the bearing carrier of FIG. 30 mounted to an open chute and illustrating a removable flexible trough for carrying liquid drained from the workpiece;

FIG. 33 illustrates a broken perspective view of the bearing assembly of FIG. 23 taken along the line 33—33 of FIG. 23; and FIG. 34 illustrates a locknut with a single locking projection.

DESCRIPTION OF THE PREFERRED EMBODIMENT

Figure 9:
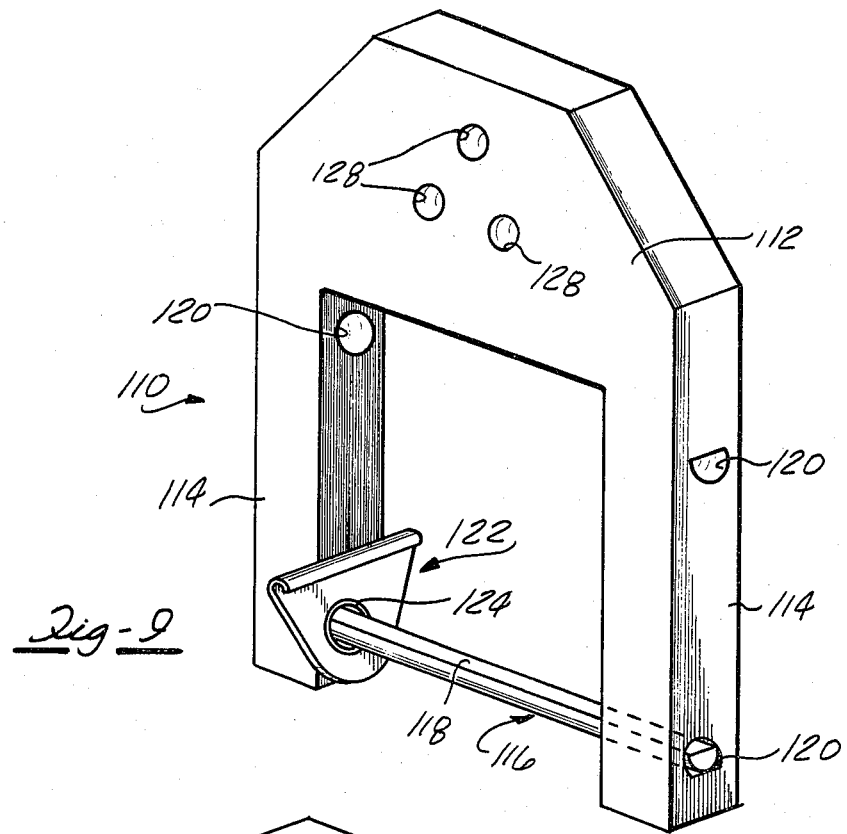
FIG. 9 illustrates a perspective view of a support bracket for supporting the chute from overhead.

Referring now to the drawing, and in particular, FIG. 23, there is illustrated at 300 a workpiece support bearing for modular chuting. The workpiece support bearing 300 comprises a support 302 engaging an aperture 304 formed in a sidewall 306 of the chute. Support 302 includes a radially enlarged flange 308 abutting the sidewall 306 to aid in the cantilever support of the support bearing. The support 302 carries a low friction bearing member 310 which includes a radially outward extending flange 312 which abuts the sidewall 306 and provides cantilever support for the vertical loads imposed on the support piece bearing 300 by the workpiece. Additionally, the flange 312 provides transverse positioning of an abrasion resistant bushing 314 which is locatingly supported by the low friction member 310. The bushing 314 includes an inner bore 316 which is rotatingly supported by the support 302 and a cylindrical outer surface 318 which engages and supports the workpiece.

The support 302 includes a threaded end 320 with a nut 322 threadingly engaging the threaded end and abutting the bearing members 310 to secure the workpiece support bearing 300 to the sidewall 306. Proper assembly of the workpiece bearing to the sidewall may be established by utilizing a torque wrench to assemble the nut 322 onto the threaded end 320. This assures that there is sufficient tension in the threaded end 320 to support the load but assures that the nut 322 is not over torqued causing damage to the chute sidewall 306 or causing the member 310 to bulge under compression. A shear section 324 which comprises a reduced diameter portion in the threaded end 320 may be utilized to prevent over torquing of the nut 322. If an over torquing occurs the shear section 324 is calculated to break and require the use of a new support piece 302 to complete the assembly in a proper manner.

Unintended loosening of the nut 322 is prevented by a plurality of spaced projections 326 formed on an end of the bearing member 310 as shown in FIG. 33. A plurality of complimentary projections 328 formed on the nut 322 alternately engage and release the projections 326 as the nut 322 is tightened. Preferably, the projections 326 and 328 have slanted sides to permit an easy rotation of the nut 322 as it is assmebled but presents a no back detenting resistance to a loosening of the nut. In a preferred embodiment the low friction bearing member 310 is made of deformable plastic, such as DELRIN sold by the Dupont Company, although there are many other plastic materials suitable for the application. By controlling the hardness of the plastic and the shape of the projections 326 the nut 322 can be assembled with a predetermined number of detents or clicks felt by the assembly person to establish the predetermined assembly torque and eliminate the need for a torque wrench in the assembly process. Alternatively, as shown in FIG. 34 of the drawing it may be necessary to only provide one complimentary projection 328 to selectively engage one of the plurality of spaced projections 326 to provide a means for preventing the unattended loosening of the nut 322. If a single complimentary projection 328 is provided, then a fresh unaltered projection 326 is presented to the complimentary projection 328 as the assembly process proceeds and a more acurate determination of the assembly torque is possible. Alternately, the nut 322 may have an interference fit on the support 302 to prevent backing off of the nut in use.

As shown in FIG. 27 of the drawing, rotation of bearing member 330 is prevented by a projection 332 which engages an opening 334 in the sidewall 306. The projection 332 preferably is extended through the sidewall and engages an opening 336 formed in the flange 308 to prevent rotation of the support 302.

Referring now to FIG. 24 of the drawing, there is illustrated at 340 a workpiece support bearing 342 that is assembled to the sidewall 306 in an alternate manner. Workpiece support bearing 342 comprises a support 344 having a radially enlarged head 346 at one end and a recess 348 formed at another end 350. The other end 350 is snugly engageable with a bore 352 formed in a bearing member 354. When assembled, the recess 348 is deformed outward as shown in FIG. 25 to form a head 356. By warming the support 344 to a predetermined elavated temperature before expanding the recess outward to form the head 356, the assembly tension on another end 350 can be readily controlled.

As shown in FIG. 26 of the drawing, there is illustrated at 360 a one piece support member and bearing member 362. The one piece support and bearing member includes a rod 364 snugly engaging the aperture 304, with a recess formed in an outward end of the rod, which recess is deformed outward after insertion into the aperture 304 to form a head 366. A first support collar 368 is sandwiched between the wall 306 and the head 366 to provide canteliver support for the workpiece bearing 360. As shown in FIG. 28, a second support collar 370 may alternately be sandwiched between the wall 306 and the support 362 to provide transverse positioning of the bushing 314 and to space the bushing from the chute wall 306.

Referring now to FIG. 29 of the drawing there is illustrated at 380 a low friction support bearing for modular chuting comprising a low friction bearing member 382 having an outer flange 384 abutting the sidewall 306, and a first bearing surface 386 spaced radially inward from the outer flange 384. A second bearing surface 388 is positioned radially inward from the first bearing surface, and a central bore 390 extends transversely through the bearing member 382. A sidewall bore 392 is formed in the sidewall 306 and snugly engages the first bearing surface to support the low friction bearing member 382. A support member 394 includes a rod 396 snugly engageable with the central bore 390 and an enlarged head 398 which abuts an inward end of the low friction bearing member 382. The support member 394 includes a deformable end 400 which is expanded radially upward when the rod 396 has been inserted into the bore 390 to secure the bearing 382 to the sidewall 306. In a preferred embodiment the support member 394 is made from a thermally softenable plastic so that the end 400 can be readily deformed outward to form a rivet like head with the application of heat such as might be obtained from ultra sonic welding, a sodering iron, or the like. A bushing 402 includes a first bore 404 rotatingly supported by the first bearing surface 386 and a second bore 406 rotatingly supported by the second bearing surface 388. Enlarged head 398 abuts the bushing 402 at an end thereof to transversely position the bushing 402 against the sidewall 306. The first and second bearing surfaces 386, 388 are spaced a distance apart to provide a reduced bearing contact area which results in a lower friction. The space between the bearing surfaces 386, 388 may also be packed with a lubricant to further enhance the low friction characterics of the workpiece support bearing 380. The outer flange, in a preferred embodiment, is secured to the sidewall 306 using a suitable adhesive.

Referring again to the drawing and in particular FIGS. 30 and 31, there is illustrated at 500 a workpiece support bearing and bearing carrier 502 that is removably secured to the chute sidewall 306 in a manner which will be described in greater detail subsequently. The chute wall 306 includes an upper opening 504 formed in the chute wall and a lower opening 506 formed in the chute wall spaced from the upper opening 504. The bearing carrier 502 comprises an outer wall 508 abutting the chute wall 306. An upper projection 510 is formed on the outer wall 508 and snugly and releaseably engages the upper opening 504. An upper hook end 512 is formed on the upper projection to releaseably grasp the chute wall. A lower projection 514 is formed on the outer wall 508 which is aligned with and releaseably engageable with the lower opening 506, and working with the upper projection 510 secures the bearing carrier 502 to the chute wall 306 and prevents rotation of the bearing carrier during use. An inner wall 516 is spaced from the outer wall 508, and a bottom wall 518 extends between and is integral with the outer and inner walls 508, 516. A pair of aligned bores 520, 522 are formed in the outer and inner walls and snugly support a support pin 524 which extends between the walls 508, 516. The pin 524 rotatingly supports a bearing roller 526. The bearing roller 526 has a through bore 528 which rotatingly engages the support pin 524 and enables the bearing roller to carry the workpiece in a low friction manner. In a preferred embodiment the bearing carrier 502 is made from an injeotion molded plastic material such as a reinforced nylon, and the support pin 524 is made from a low friction injection molded plastic such as DELRIN a Dupont product. FIG. 32 of the drawing illustrates the bearing carrier 502 mounted to a wall of a chute.

Referring again to FIG. 32 of the drawing there is illustrated a trough 530 carried along the bottom portion of the chute to convey liquids and fluids drained from the workpiece from the trough. The trough 530 includes a plurality of transverse convolutions 532 extending across the trough. The convolutions 532 give the trough flexibility enabling it to conform to any curvature in a chute and still provide a continuous seamless conveyance for liquids. The convolutions 532 meet at the center of the trough a central depression 534 which is the low point of the trough and provides for complete drainage of the convolutions 532 and thus completes drainage of the trough 530. Preferably the convolutions are inclined from the sidewall in a direction toward the drainage point. This produces a herring bone effect that aids in drainage of the trough. An overhanging lip 536 is provided to secure the trough 530 between sidewalls of the chute. Alternately, (clips not shown) may be attached to the sidewall 306 to secure the trough 530 in place.

Referring now to FIG. 11 of the drawing, there is illustrated another example of the present invention in the form of an open chute assembly 200 adapted to pass a workpiece there along under gravity. The open chute assembly 200 comprises a pair of spaced apart sidewalls 210 having an upper edge 212 and a lower edge 214. A plurality of clips 216 are deployed along the upper and lower edges to position and retain the sidewalls in a spaced apart position. A plurality of grooves 218 are formed along the sidewalls 210. Each clip 216 includes a pair of spaced legs 220 extending over the grooves 218. The legs 220 include projections 222 aligned with and complimentary to the grooves 218 to secure the clips 216 to the sidewall.

Figure 21:
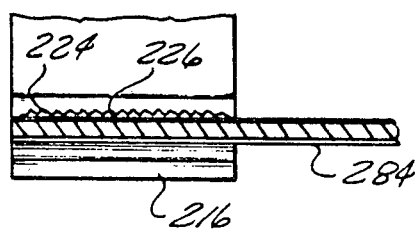
FIG. 21 illustrates a cross-sectional view through the sidewall of FIG. 20 taken along the line 21—21 of FIG. 20.

As shown in FIG. 21 of the drawing, the preferred embodiment further includes a plurality of vertical grooves 224 overlaying the grooves 218 and a plurality of vertical projections 226 on the clip 216 and aligned with and complimentary to the vertical grooves 224 to secure the clip 216 against longitudinal movement along the sidewall 210.

Referring again to FIG. 11 of the drawing, a support clip 228 engages the clip 216 and comprises a pair of spaced legs 230, 232 snugly engaging a transverse portion of the clip 216. A pair of outward extending legs 234 integral with one of the spaced legs 230 snugly supports a wear-resistant support piece 236 between legs. The support piece 236 extends longitudinally along the chute and provides a low friction and wear-resistant support for the workpiece as it passes along the chute.

Figure 15:
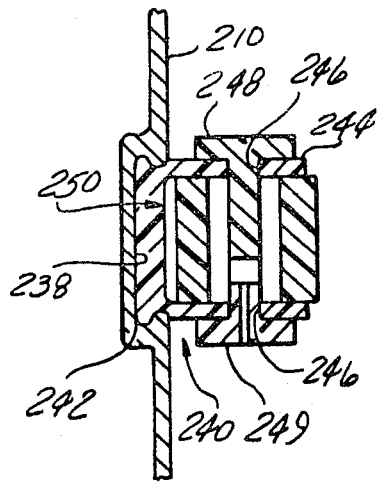
FIG. 15 illustrates a cross-sectional view through the sidewall illustrating a dove-tail mounting for an anit-friction bearing.

As shown in FIG. 15 of the drawing, the sidewall 210 may include a dovetail groove 238 formed along the sidewall, with a bearing support 240 having a dovetail 242 snugly engageable with the dovetail groove 238. A pair of spaced apart arms 244 extend inward from the dovetail with a pair of vertically aligned apertures 246 formed in the arms. A pair of headed pins 248, 249 engage the vertically aligned apertures 246 to support an anti-friction bearing 250 and provide anti-friction transverse positioning for the workpiece.

Figure 16:
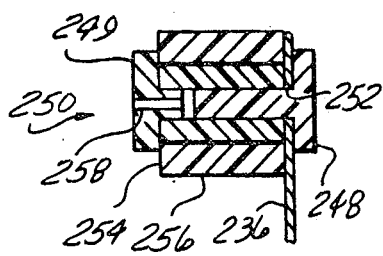
FIG. 16 illustrates a cross-sectional view taken through a support bearing taken along the line 16—16 in FIG. 11.
Figure 12:
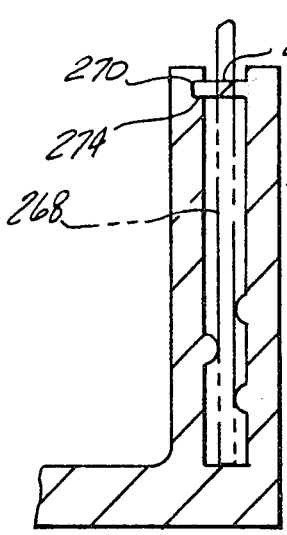

FIG. 16 of the drawing illustrates a cross-sectional view of an anti-friction bearing mounted to the wear-resistant support piece 236. As shown in FIG. 16 a plurality of apertures 252 are formed along the support piece 236, and the support pin 248 snugly engages the apertures. An anti-friction sleeve 254 snugly engages the headed pin 248 and abuts the support piece 236 securing the pin 248 and the sleeve 254 to the support piece. A wear-resistant roller 256 slidingly engages the anti-friction sleeve 254 to hold the roller 256 in place. Adhesives may be used to secure the pins 248, 249 to the wear-resistant support piece 236 and the anti-friction sleeve 254, or a snug fit or press fit may be relied upon to hold the parts in place. An opening 258 is provided in the headed pin 249 to allow air to escape during assembly and to prevent air lock.

Figure 17:
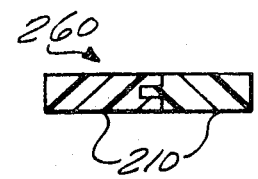
FIG. 17 illustrates a cross-sectional view through the sidewall showing a tongue and groove joint for joining lengths of sidewall.

FIG. 17 of the drawing illustrates a cross-sectional view through a portion of the sidewall 210 wherein a pair of abutting sidewalls are adjoined by use of a tongue and groove joint 260. A suitable adhesive such as epoxy glue may be used to permanently fasten the abutting pieces 210.

Figure 18:
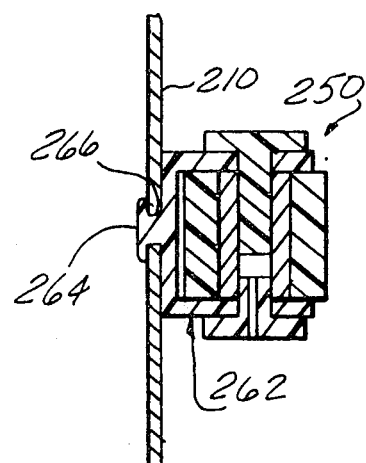
FIG. 18 illustrates a cross-sectional view through an anit-friction bearing with the bearing mounted to the sidewall by a headed projection penetrating an opening formed in the sidewall.

FIG. 18 of the drawing illustrates an alternate bearing support 262 for mounting the bearing 250 to the sidewall 210 and comprises a headed projection 264 snugly engaging an aperture 266 formed in the sidewall 210.

Figure 19:
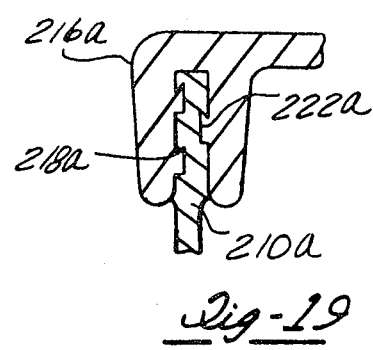
FIG. 19 illustrates a cross-sectional view through the clip and a portion of the sidewall showing an interlocking joint between the sidewall and the clip.

As shown in FIG. 19 of the drawing, a clip 216(a) having interlocking projections 222(a) may be used to secure the clip to a sidewall 210(a). The sidewall includes corresponding recesses 218(a) to engage the projections 222(a) and secure the clip to the sidewall.

Figure 12:
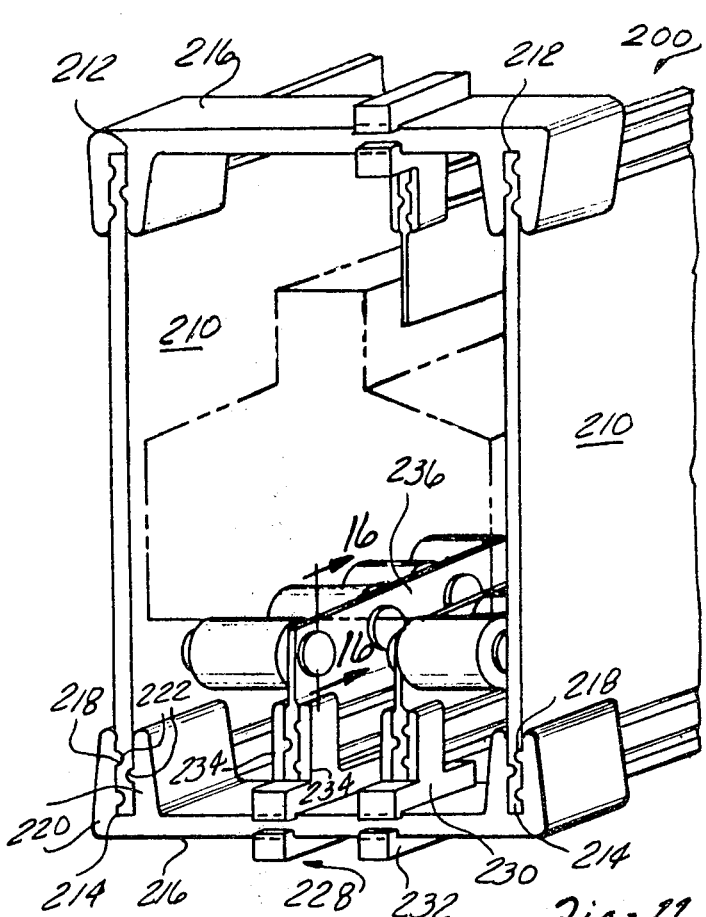
FIG. 12 illustrates a cross-sectional view through the clips, the clip having a projection which engages an aperture formed in the sidewall and an aperture in an opposite leg of the clip.

FIG. 12 of the drawing illustrates a means for securing the clip 216b to a flat piece of sidewall 268 with the sidewall 268 not having projections to secure the clip to the sidewall. The clip 216b includes a projecting pin 270 which engages an aperture 272 formed in the sidewall 268 and engaging a recess 274 formed in an opposite leg of the clip. The pin 270 secures the clip 216b to the sidewall 268 and prevents movement of the clip 216b relative to the sidewall 268.

Figure 13:
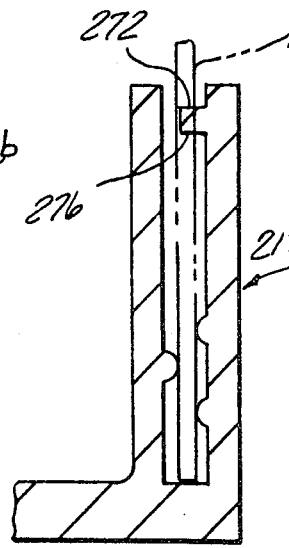
FIG. 13 illustrates a cross-sectional view through the clip wherein the clip includes a projection for engaging an aperture formed in the sidewall of the chute.

FIG. 13 of the drawing illustrates at 217 an alternate clip configuration for securing the clip 217 to a flat sidewall 268. A clip 217 comprises a projection 276 to engage the aperture 272 formed in the sidewall 268 and prevent relative movement of the clip 217 with respect to the wall 268.

Figure 14:
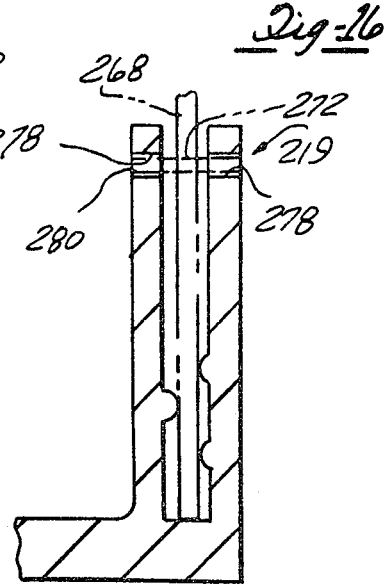
FIG. 14 illustrates a cross-sectional view through the clip wherein the clip includes a pair of aligned apertures in the clip legs with a pin snugly engaging the apertures and an aligned aperture in the sidewall.

FIG. 14 of the drawing illustrates a second alternative clip configuration 219 for securing the clip to the sidewall 268. This configuration comprises a pair of aligned apertures 278 formed in the legs of the clip aligned with the aperture 272 formed in the wall 268 and a pin 280 engaging the aperture 278 and 272 to secure the clip 219 to the sidewall 268.

Figure 20:
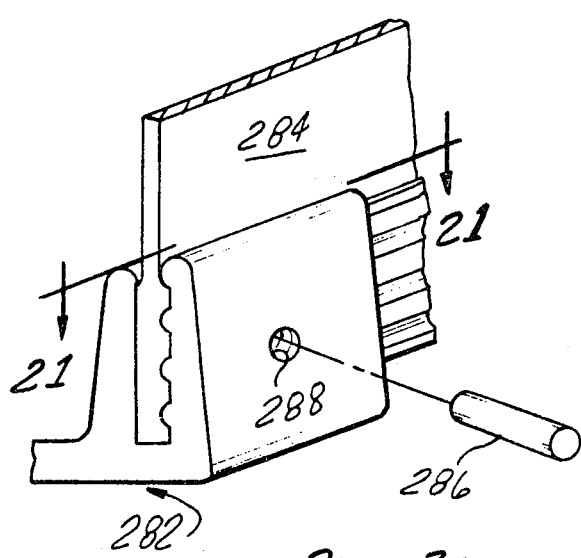
FIG. 20 illustrates a broken perspective view of an end of a clip and the sidewall.

FIG. 20 of the drawing illustrates a broken-perspective view of a clip 282 joined to a sidewall 284 with vertical grooves 224 (FIG. 21) snugly receiving vertical projections 226 to secure the clip 282 to the wall 284. An aperture 288 formed through the legs of the clip and the wall 284 receives a pin 286 to further aid in securing the clip 282 and the wall 284 into a permanent assembly.

Figure 22:
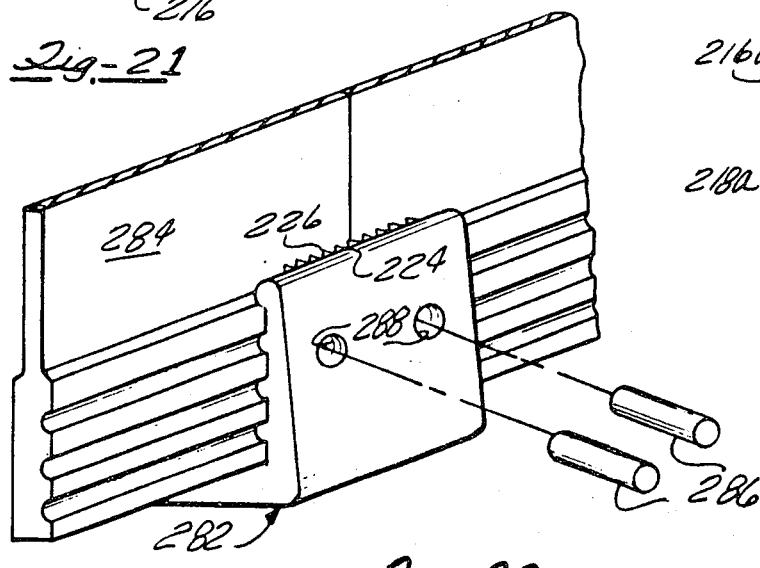
FIG. 22 illustrates a broken perspective view of a sidewall and clip with provision for abutting and securing a pair of joined sidewalls.

As shown in FIG. 22 of the drawing, the plurality of vertical grooves 224 and the plurality of vertical projection 226 formed in the legs of the clip 282 may be employed to secure a pair of sidewalls 284 in abutment. A pair of transverse apertures 288 formed through the legs of the clip and the sidewall 284 accommodate a pair of pins 286 to secure the clip to the sidewalls 284 and assure a secure joint.

Referring again to the drawing, there is illustrated in FIG. 1 another example of the present invention in the form of a chute assembly 10 and includes a chute 12 having a U-shaped cross-section including a bottom wall 14, a pair of opposed sidewalls 16, 18 formed into a unitary structure. The bottom wall 14 includes an inside surface 20 and an outside surface 22, and each opposed sidewall 16, 18 includes an inside surface 24 and an opposed sidewall outside surface 26. A joining means 28 is provided for abutting and securing a plurality of chutes 12 into a continuous member. A means 30 is provided for securing a wear-resistant member to the walls of the chute. The means 28 and 30 will be discussed in greater detail hereinbelow.

Referring now to FIGS. 1 and 2 of the drawing, the means 28 for joining lengths of chute 12 comprises a pair of opposed grooves 32 formed longitudinally along the outside wall surface 26, and a U-shaped coupling member 34 comprising a coupling bottom wall 36 and a pair of opposed upright walls 38 integral with the bottom wall 36 formed into an integral member. The upright walls 38 include an upper edge 40 along which is formed a bead 42 which is snugly engageable with the opposed grooves 32 to secure the coupling member 34 to the chute 12. In a preferred liquid carrying embodiment, a pair of chutes 12 with abutting ends are first covered along their abutting ends with adhesive and the coupling member 34 is applied abutting the outside surfaces 22, 26 with adhesive applied between the abutting surfaces. This forms a continuous member with smooth, continuous inside surfaces to allow smooth sliding of workpieces along the chute. As shown in FIG. 6 of the drawing, a joining bead 44 may be employed to snugly engage the groove 32 and hold lengths of chute in an aligned position. In utilizing the joining bead 44, the abutting ends are covered with adhesive and joined to form a smooth, continuous joint. If good alignment and abutment is not possible between adjoining chutes 12, it is recommended that a coupling member 34 be employed to affect the joint rather than the use of the joining bead 44. In another embodiment illustrated in FIG. 5, an L-shaped joining bead 46 may be employed. The L-shaped joining bead 46 includes a bead bottom wall 48 and a bead vertical wall 50 abutting the outside surfaces of the chute 12. A projection 52 snugly engages the opposed groove 32 to hold the abutting pieces of conduit 12 in alignment. It is preferable to wet the abutting surfaces with adhesive prior to joining them together. The L-shaped joining bead is employed to hold the abutting lengths of conduit 12 in abutment and alignment until the adhesive forms a bond to produce a liquid-tight, smooth, permanent joint for moving workpieces therealong.

As is illustrated in FIG. 2 of the drawing, the means 30 for securing a wear-resistant member to the walls of the chute comprises a pair of spaced-apart, opposed recesses 54 formed longitudinally along an inside surface of the chute 12, and a wear-resistant member 56 such as a hardened steel plate or abrasion-resistant plastic piece snugly retained between the recesses 54.

As illustrated in FIGS. 2, 3 and 4 of the drawing, a second embodiment of the means 30 for securing a wear-resistant member to the walls of the chute comprises a plurality of dovetail grooves 58 formed longitudinally along the inside walls of the chute 12. The dovetail grooves 58 are configured to snugly retain a variety of wear-resistant members as shown in FIG. 3 and comprises an insert 60 having a first end 62 with a complementary form to snugly engage the dovetail groove 58 and an inward projecting second end 64 to abut and support the workpiece. The insert 60 may be made from wear-resistant steel or plastic, depending upon the workpiece to be supported. Also, anti-friction materials such as bonded graphite fibers, TEFLON or TEFLON-coated steel may be used.

FIG. 4 of the drawing illustrates a support 66 for a wear-resistant insert 68. The support 66 includes a lower end 70 snugly engageable with the dovetail 58 and a pair of upward extending legs 72 to snugly retain the wear-resistant insert 68.

Referring now to FIG. 7 of the drawing, there is illustrated a bearing support 70 for supporting a roller bearing 72. The bearing support 70 comprises a dovetail end 74 snugly engaging the dovetail groove 58 and an inward projecting rod end 76 to rotatingly support the roller bearing 72 along a bearing bore 78.

Referring again to FIG. 1 of the drawing, there is illustrated at 80 an additional means for securing a wear-resistant member to the walls of the chute comprising a plurality of spaced apertures 82 formed along the wear-resistant member 56, a rod 84 engaging each aperture 82, a thread formed on one end of the rod 84 with a nut 86 engaging the thread to secure the rod to the member 56. A bearing 86 is rotatably supported by the rod 84 and provides a support for the workpiece.

Also shown in FIG. 1 of the drawing is a flat, wear-resistant plate 88 secured to the inside wall of the chute 12 by a pair of spaced dovetails 58. A pair of projections 90 formed along the flat plate 88 abut the dovetails 58 to secure the plate 88 to the wall of the chute 12.

FIG. 4 of the drawing illustrates a support 66 for a wear-resistant insert 68. The support 66 includes a lower end 70 snugly engageable with the dovetail 58 and a pair of upward extending legs 72 to snugly retain the wear-resistant insert 68.

Referring now to FIG. 7 of the drawing, there is illustrated a bearing support 70 for supporting a roller bearing 72. The bearing support 70 comprises a dovetail end 74 snugly engaging the dovetail groove 58 and an inward projecting rod end 76 to rotatingly support the roller bearing 72 along a bearing bore 78.

Referring again to FIG. 1 of the drawing, there is illustrated at 80 an additional means for securing a wear-resistant member to the walls of the chute comprising a plurality of spaced apertures 82 formed along the wear-resistant member 56, a rod 84 engaging each aperture 82, a thread formed on one end of the rod 84 with a nut 86 engaging the thread to secure the rod to the member 56. A bearing 86 is rotatably supported by the rod 84 and provides a support for the workpiece.

Also shown in FIG. 1 of the drawing is a flat, wear-resistant plate 88 secured to the inside wall of the chute 12 by a pair of spaced dovetails 58. A pair of projections 90 formed along the flat plate 88 abut the dovetails 58 to secure the plate 88 to the wall of the chute 12.

It is often desirable to partially cover the open top of the chute with a part retainer to prevent parts from falling out of the chute when a jam-up occurs. FIG. 8 of the drawing illustrates a part retainer 92 having a top wall 94 overlaying the open top. A pair of upper grooves 96 formed along the pair of opposed side walls 16, 18 proximate the open top are utilized to retain the part retainer 92 to the side walls. A pair of downward extending legs 98, 100 includes a hook-like projection 102 at a lower end thereof to snugly engage the upper grooves 96 and retain the part retainer 92 to the side wall.

Figure 10:
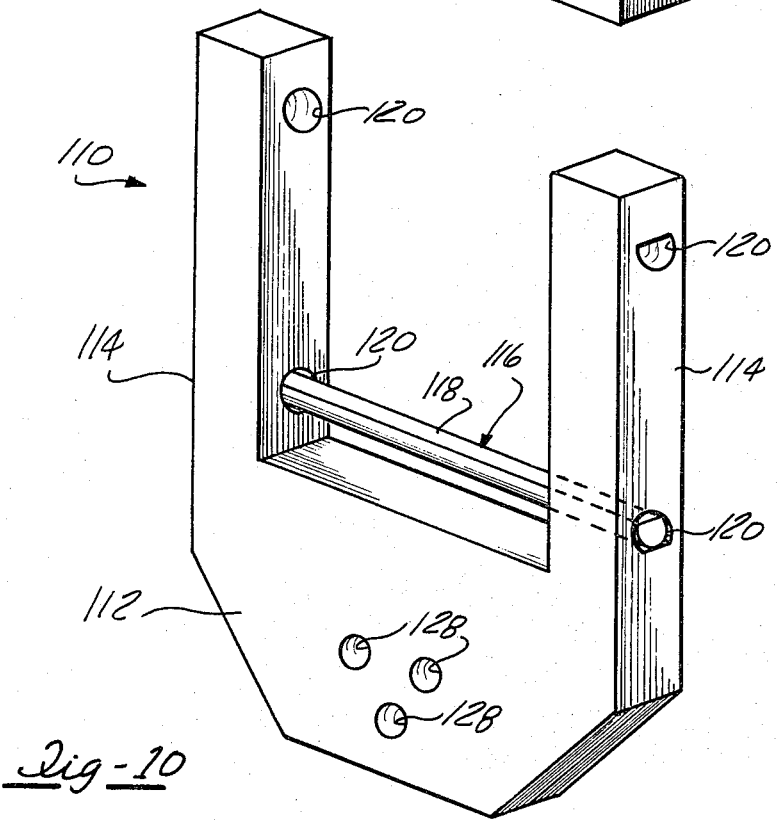
FIG. 10 illustrates a perspective view of the support bracket of FIG. 9 deployed to support the chute from the ground.

As shown in FIGS. 1, 9 and 10 of the drawing, a support bracket 110 is provided which can support the chute 12 from either below the chute or above the chute. The bracket 110 comprises a transverse member 112 and a pair of projecting legs 114 spaced to straddle the trough 12 therebetween. A dowel 116 with a flat side 118 extends between legs 114 and is supported by apertures 120 formed in the projecting legs 114. The dowel 116 is allowed to rotate within the aperture 120 once it is in place so that the flat side of the dowel can abut the bottom wall outside surface 22. A pair of retaining clips 122 is slidingly retained by the dowel 116. Each clip 122 includes an aperture 124 to slidingly engage the dowel 116 and an upper bead 126 to snugly engage the opposed grooves 32, securing the bracket 110 to the chute 12. As shown in FIG. 1 of the drawing, the brackets 110 can support the trough 12 from either above or below. A plurality of apertures are utilized to secure the bracket 110 to a suspension rod or a post providing the support for the bracket 110, which in turn supports the chute 12.

It can thus be seen that the present invention has provided a new and improved support bearing for passing a workpiece along a chute. It is obvious to the skilled artisan that the support bearing can be made from a variety of materials including injection molded plastic, sintered metals, die cast metals etc. It is contemplated that the support bearing can be made economically from reinforced NYLON or DELRIN, although the teachings of the invention are not limited to these materials.

It is also obvious to the skilled artisan that, in the preferred embodiment, the chute may be assembled in a curved or serpentine manner with the clips maintaining the sidewalls in a properly spaced and vertical position for the movement of the workpiece under gravity. In a serpentine trough configuration it is recommended that the trough 530 illustrated in FIG. 32 be used to catch and convey any liquid that may drain from the parts.

It should be understood by those skilled in the art of modular chutes that other forms of the Applicant's invention may be had, all coming within the spirit of the invention and the scope of the appended claims.

Having thus described my invention, what I claim is:

1. In a workpiece support bearing for modular chuting comprising a chute for passing the workpiece; a support engaging a first aperture formed in a chute wall; a low friction bearing member carried by the support; said bearing member including a flange extending radially outward abutting the chute wall; a bushing rotatingly carried by the bearing member; the invention comprising:

the support including a support flange extending radially outward abutting the chute wall, an aperture formed in said support flange, a second aperture formed in the chute wall aligned with the aperture formed in said support flange, and a projection extending longitudinally from the bearing member flange engaging the aperture formed in said support flange and the second aperture in the chute wall wherein rotation of the support and the bearing member is prevented.

2. The device as defined in claim 1 further comprising a threaded end formed on the support, a plurality of projections formed on the bearing member, a plurality of complimentary projections formed on a nut threadingly engaged with said threaded end, and wherein interlocking of the plurality of projections with the plurality of complimentary projections prevents loosening of said nut.

3. The workpiece support as defined in claim 1 further comprising
   a threaded end formed on said support;
   a nut threadingly engaging said threaded end and abutting said bearing member; and
   said nut assembled using a torque wrench and a predetermined amount of torque.

4. The workpiece support as defined in claim 1 further comprising
   a plurality of spaced projections formed on said bearing member, and a plurality of complimentary projections formed on said nut abutting said spaced projections.

* * * * *